April 9, 1946.  J. D. HOWELL  2,398,310

METHOD OF PRODUCING EXTERNAL BROACHES

Filed April 4, 1945

INVENTOR
JOHN D. HOWELL
BY
ATTORNEY

Patented Apr. 9, 1946

2,398,310

UNITED STATES PATENT OFFICE 2,398,310

METHOD OF PRODUCING EXTERNAL BROACHES

John D. Howell, Ilion, N. Y., assignor to Remington Arms Company, Inc., Bridgeport, Conn., a corporation of Delaware Application April 4, 1945, Serial No. 586,607

10 Claims. (Cl. 76—101)

The present invention relates to a method of producing external broaches, of the type for use in the making of splined shafts, gears, and similar stuctures having an external broached formation, an object of the invention being to provide a method by which external broaches are adapted to be produced economically and with a high degree of accuracy. In particular, it is proposed to provide a method whereby the successive cutting teeth of the broach are provided in a series of separate plate members, the plate members being arranged in a stack during the formation of the broach to form the circumferential wall of the teeth with a predetermined clearance angle, produced by a tapered hole formed through the stacked plates, which also forms successively reduced openings through the plates, the plates being thereupon rearranged in the assembled broach in reverse order so that the clearance angles of the teeth are inclined in opposite direction to the taper of the work receiving passage formed by the plate openings through the broach.

It is further proposed to produce radial slots about the perimeter of the tapered hole therethrough, whereby the teeth of the downwardly successive plates decrease in effective radius and increase in radial depth.

With the above and other objects in view, embodiments of the invention are shown in the accompanying drawing, and these embodiments will be hereinafter more fully described with reference thereto, and the invention will be finally pointed out in the claims.

In the drawing.

Similar reference characters indicate corresponding parts throughout the several figures of the drawing.

Figure 1:
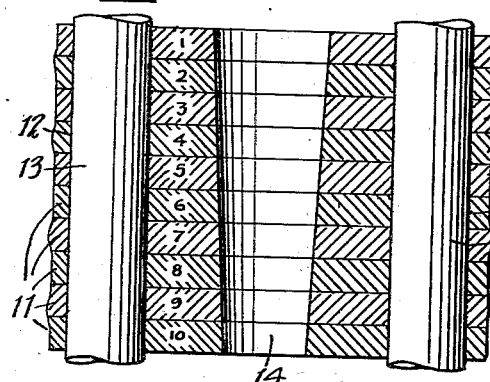
Fig. 1 is a vertical sectional view, showing the aligned stack of plates from which the broach is to be formed, and showing a tapered hole formed therethrough as one step of the method.

Referring to the drawing, and particularly to Figs. 1 to 5 thereof, the broach according to the exemplary embodiment of the invention illustrated therein, is formed from a series of plates 11 which may be of any suitable number, ten plates being shown in the illustrated embodiment of the invention, identified by the numbers "1" to "10," which in practice may be stamped or otherwise suitably provided upon the respective plates. The plates "1" to "10" are arranged successively in a stack with the plate "1" at the top, and thereupon a series of vertical aligning holes 12 are drilled and reamed therethrough and are engaged by aligning pins 13. With these aligning pins in place, a tapered hole 14 is produced through the stacked plates, which at the large end at the upper face of the plate "1" is of the same diameter as the stock to be broached, while the small end at the lower face of the plate "10" is reduced by the amount of material to be removed from the part to be broached at a single pass of the broach.

If the finished part formed by the broach is of such shape that the diametrically smallest portion of the profile is represented by arcs of the same radii, such as a simple multiple spline, then the tapered hole may be made conical by boring or reaming, as illustrated. If, however, the profile at the minimum diameter is of a contour other than circular, then the tapered hole is formed by means best suited to the particular shape, such as a shaper or other reciprocating tool.

Figure 2:
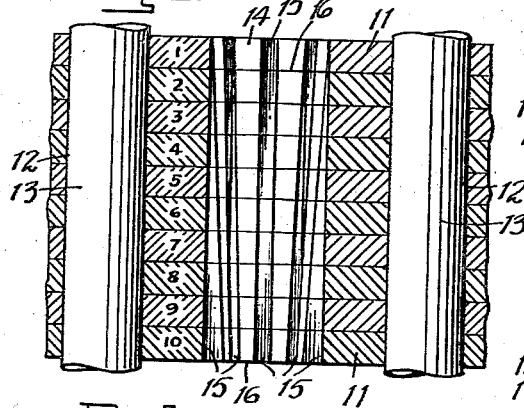
Fig. 2 is a similar view, showing radial slots cut about the perimeter of the tapered hole, as a further step of the method.
Figure 3:
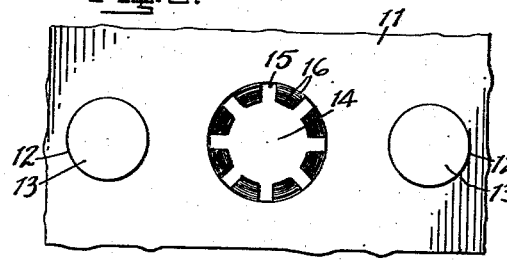
Fig. 3 is a top plan view of the stacked plates, as shown in Fig. 2.
Figure 4:
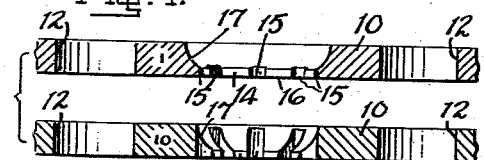
Fig. 4 is a vertical sectional view of two of the plates, removed from the stack, and illustrating a further step in the method, wherein the several plates have clearance cuts formed therein.

After the tapered hole 14 is produced a series of radially arranged slots 15 are cut in the perimeter of the wall of the hole, and these slots will be of such shape as to complete the profile of the part to be broached. The edges 16 at the lower face of each plate between the slots 15 are the cutting edges of the broaching teeth, the tapered surface extending above these edges and formed by the taper of the hole 14 providing the clearance angle of the teeth. In the most simplified form the walls of the slots 15 will be parallel with the axis of the tapered hole, as shown in Figs. 2 and 3, permitting the formation of the slots with a simple reciprocating tool.

Figure 9:
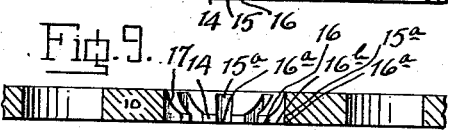
Fig. 9 is a vertical sectional view of one of the broach plates produced by another modification of the method.

By a modified method the slots may be produced with a slight taper in the same direction as the taper of the hole 14 along part or all of the profile of the slot, for the purpose of providing a cutting or scraping action along the edges of the slots in addition to the cutting action of the circumferential tooth edges between the slots. A completed plate according to this modified method is illustrated in Fig. 9, the plate illustrated being the plate "10," and showing both the base and side walls of the slots 15ª slightly tapered. In this case, the edges 16ª and 16ᵇ of both the base and side walls of the slots will be cutting edges. If only the bases or only the side walls of the slots are tapered, then only the bases or the side walls will have cutting edges, as the case may be.

After the slots are formed, the aligning pins 13 are withdrawn, and the individual plates are respectively provided with clearance cuts 17 in the back of each plate, that is at the opposite face of the plate from the cutting face, to provide space for chips. These cuts 17 are progressively decreased in diameter in the plates "1" to "10," corresponding to the decrease in effective radius of the plate openings, so that the clearance space in each plate provides substantially the same width clearance area in surrounding relation to the cutting teeth of the several plates.

Figure 5:
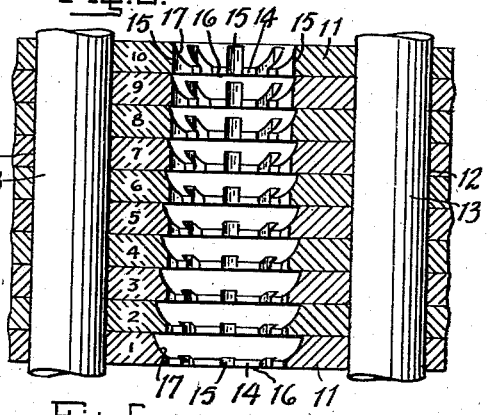
Fig. 5 is a vertical sectional view of the completed broach, with the plates rearranged therein, as a further step of the method.

The plates are then stacked as shown in Fig. 5, in reverse order to that employed when forming the tapered hole 14, so that the cutting face of the plate having the largest opening, that is the plate "1," will be on the leading side of the stack. After assembling in this manner and positioning the plates in their original rotative order with respect to the aligning pin holes 12, the pins 13 are placed in the holes and the assembly is locked in a suitable holder, which may be, for instance, clamping end plates engaged upon the ends of the pins 13 and secured by nuts or other suitable retaining means.

It will be seen that in the completed broach the clearance angle of the cutting teeth, which corresponds to the angle of taper of the hole 14 is oppositely inclined to the tapered broaching passage through the broach formed by the successive decrease in the effective radius of the teeth of the successive plates from the leading side of the stack from which the work enters the broach. Also, the radial depth of the teeth increases successively with the decrease in the effective radius of the teeth.

Figure 6:
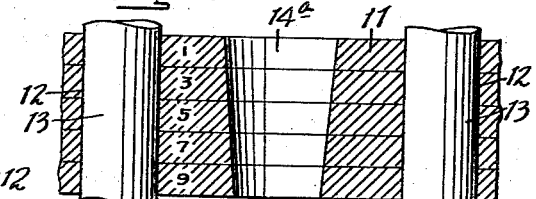
Figs. 6 and 7 are vertical sectional views, similar to Fig. 1, and illustrating a modification of the method, wherein a tapered hole is produced in each of two separately arranged stacks.
Figure 7:
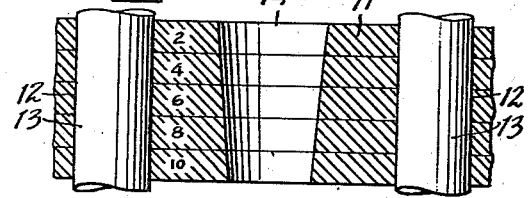
Figure 8:
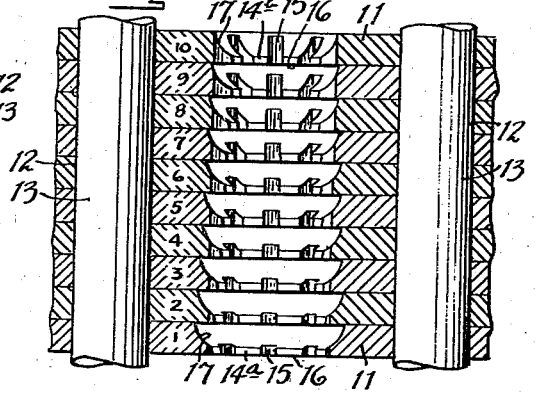
Fig. 8 is a vertical sectional view, showing the plates according to the modification of the method illustrated in Figs. 6 and 7, rearranged to form the completed broach.

In Figs. 6 to 8, there is illustrated a further modified method, by which a greater clearance angle, in proportion to the depth of cut of each cutting edge, is produced. In carrying out this method, the plates "1" to "10" are first stacked in the order as shown in Fig. 1, with the plate "1" at the top, and the aligning pin holes 12 are made therethrough. The plates are thereupon separated to form two stacks, as shown respectively in Figs. 6 and 7, wherein the plates "1," "3," "5," "7" and "9" are arranged in one stack, while the alternate plates "2," "4," "6," "8" and "10" are arranged in another stack. Tapered holes 14ª and 14ᵇ are respectively made through the two stacks, the upper end of the hole 14ª at the upper face of the plate "1" corresponding to the diameter of the stock to be broached, while the lower small end of the hole 14ᵇ in the lower face of the plate "10" is reduced by the amount of material to be removed from the part to be broached at a single pass of the broach. While the angle of taper is the same through the two stacks the diameters of the upper and lower ends of the tapered holes 14ª and 14ᵇ vary by one-half the difference between the diameters of two adjacent plates in a stack, and whereby the plates when rearranged in a single stack by alternate plates taken from the two stacks, as shown in Fig. 8, will have holes of progressively decreasing diameters from the entering end of the broaching passage, but with greater clearance angles than the clearance angles of the broach as produced by the method illustrated in Figs. 1 to 5.

Following the formation of the holes 14ª and 14ᵇ in the two stacks as shown in Figs. 6 and 7, the plates "1" to "10" are arranged in a single stack in their original order with the plate "1" at the top, and the radially arranged slots 15 are produced therethrough either by the method shown in Fig. 2, where the base and side walls of the slots are parallel to the axis of the tapered hole, or by the method shown in Fig. 9 where the slots are slightly tapered along part or all of the profile of each slot. Thereupon the plates are separated, the clearance cuts 17 are formed, and the plates re-assembled in reverse order with the plate "1" at the leading side of the stack with its opening forming the entrance end of the broaching passage through the broach.

The form of the invention illustrated in the drawing and described herein is typical and illustrative only, and it is evident that the invention is capable of embodiments in other forms, all falling within the scope of the appended claims, which are to be broadly construed.

What is claimed is:

1. The method of producing external broaches which consists in arranging a plurality of plates in face to face relation in a stack, forming a tapered hole therethrough having its axis perpendicular to the faces of said plates, to form in each of said plates a broaching formation having its cutting edge in the face at the convergent end of the hole through each plate, and rearranging said plates in a stack in reverse order to their arrangement in said first stack.

2. The method of producing external broaches which consists in arranging a plurality of plates in face to face relation in a stack, forming a tapered hole therethrough having its axis perpendicular to the faces of said plates, slotting through said plates in the perimeter of said tapered hole to form in each of said plates a broaching formation having its cutting edge in the face at the convergent end of the hole through each plate, and rearranging said plates in a stack in reverse order to their arangement in said first stack.

3. The method of producing external broaches which consists in arranging a plurality of plates in face to face relation in a stack, forming a tapered hole therethrough having its axis perpendicular to the faces of said plates, forming a plurality of radial slots through said plates in the perimeter of said tapered hole to form in each of said plates a plurality of broaching teeth having their cutting edges in the face at the convergent end of the hole through each plate, and rearranging said plates in a stack in reverse order to their arrangement in said first stack.

4. The method of producing external broaches which consists in arranging a plurality of plates in face to face relation in a stack, forming a tapered hole therethrough having its axis perpendicular to the faces of said plates, forming a plurality of radial slots through said plates in the perimeter of said tapered hole parallel to the axis of said hole to form in each of said plates a plurality of broaching teeth having their cutting edges in the face at the convergent end of the hole through each plate, and rearranging said plates in a stack in reverse order to their arrangement in said first stack.

5. The method of producing external broaches which consists in arranging a plurality of plates in face to face relation in a stack, forming a tapered hole therethrough having its axis perpendicular to the faces of said plates, forming a plurality of radial slots through said plates in the perimeter of said tapered hole to form in each of said plates a plurality of broaching teeth having their cutting edges in the face at the convergent end of the hole through each plate, at least one wall of each of said slots being tapered in the same direction as the taper of said hole, and rearranging said plates in a stack in reverse order to their arrangement in said first stack.

6. The method of producing external broaches which consists in arranging a plurality of plates in face to face relation in a stack, forming a tapered hole therethrough having its axis perpendicular to the faces of said plates to produce in each of said plates a cutter having its cutting edge in the face at the convergent end of the hole through each plate, separating said plates from said stack and forming a clearance cut about the hole of each plate at its face remote from its cutting face, and rearranging said plates in a stack in reverse order to their arrangement in said first stack.

7. The method of producing external broaches which consists in arranging a plurality of plates in face to face relation in a stack, forming a tapered hole therethrough having its axis perpendicular to the faces of said plates, forming a plurality of radial slots through said plates in the perimeter of said tapered hole to form in each of said plates a plurality of broaching teeth having their cutting edges in the face at the convergent end of the hole through each plate, separating said plates from said stack and forming a clearance cut about the hole of each plate at its face opposite its cutting face, and rearranging said plates in a stack in reverse order to their arrangement in said first stack.

8. The method of producing external broaches which consists in arranging a plurality of plates in face to face relation in a stack, securing said plates in aligned relation and in predetermined rotative order, forming a tapered hole therethrough having its axis perpendicular to the faces of said plates, to form in each of said plates a broaching formation having its cutting edge in the face at the convergent end of the hole through each plate, rearranging said plates in a stack in reverse order to their arrangement in said first stack, and securing said plates in axial alignment and in said predetermined rotative order 9. In the production of external broaches comprising a series of plates provided with apertures having marginal cutting edges formed to a desired clearance angle, the method which comprises stacking a plurality of plate blanks in face to face relation, producing in said stack a hole of a taper equal to the desired clearance angle, and rearranging said plates in a stack in face to face relation and in reverse order to their arrangement in said first stack.

10. In the production of external broaches comprising a series of plates provided with apertures having marginal cutting edges formed to a desired clearance angle, the method which comprises arranging a plurality of plate forming blanks in face to face relation in a first stack, and arranging another plurality of plate blanks in face to face relation in a second stack, producing in said first stack a hole of a taper equal to the desired clearance angle and of a given maximum diameter, producing in said second stack a hole of said taper and of a lesser maximum diameter, and rearranging said plates in reverse face to face relation in a single stack of plates taken in order and alternately from said first and second stacks.

JOHN D. HOWELL.